United States Patent

[11] 3,608,728

| [72] | Inventor | Leslie E. Trimble |
| | | 1341 West Vista Way, Vista, Calif. 92083 |
| [21] | Appl. No. | 866,561 |
| [22] | Filed | Oct. 15, 1969 |
| [45] | Patented | Sept. 28, 1971 |

[54] OIL SKIMMER
7 Claims, 3 Drawing Figs.

[52] U.S. Cl. .................................................. 210/242, 210/354
[51] Int. Cl. ...................................................... E02b 15/04
[50] Field of Search ............................................ 210/242, 354

[56] References Cited
UNITED STATES PATENTS
| 2,147,088 | 2/1939 | Carson .......................... | 210/354 |
| 3,358,838 | 12/1967 | Kosar et al. .................... | 210/242 X |

*Primary Examiner*—Samih N. Zaharna
*Attorney*—Angus & Mon

ABSTRACT: A skimmer for removing oil from the surface of water which includes a cylindrical float mounted to a frame so that the float may rotate with its axis parallel to the surface of the water, a second float connected to the other through the frame with paddles that cause the second float to rotate and actuate a bellcrank and connecting rod system to rotate the cylindrical float. A scraper contacts the upper surface of the cylindrical float to remove oil collected on the surface of the float and allows it to drain down the trough in the scraper into a drainpipe that will flow the oil into a reservoir for storage. In operation, a push-bar frame is attached to the second float having paddle vanes and the entire apparatus would be pushed by a boat, thereby using the motion through the water to actuate the paddle wheel to rotate the oil skimmer float to pick up oil from the surface.

PATENTED SEP 28 1971
3,608,728
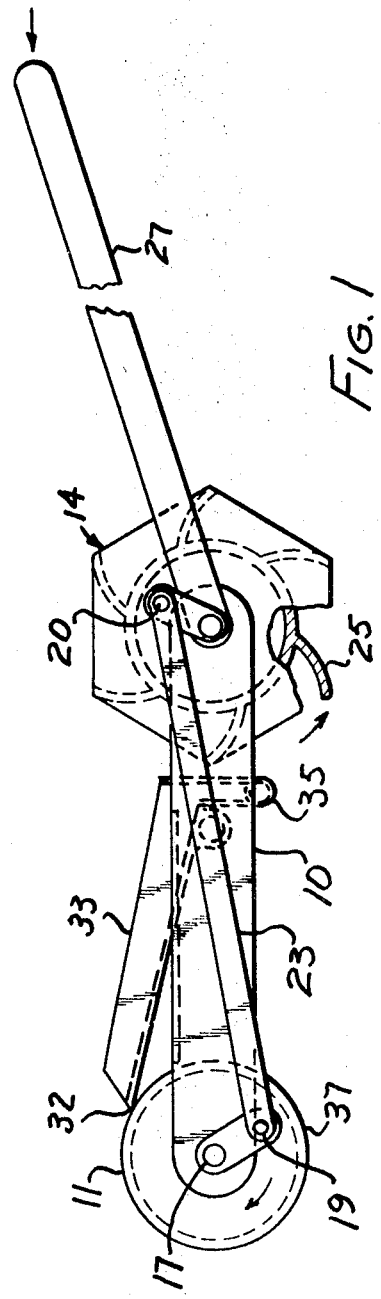
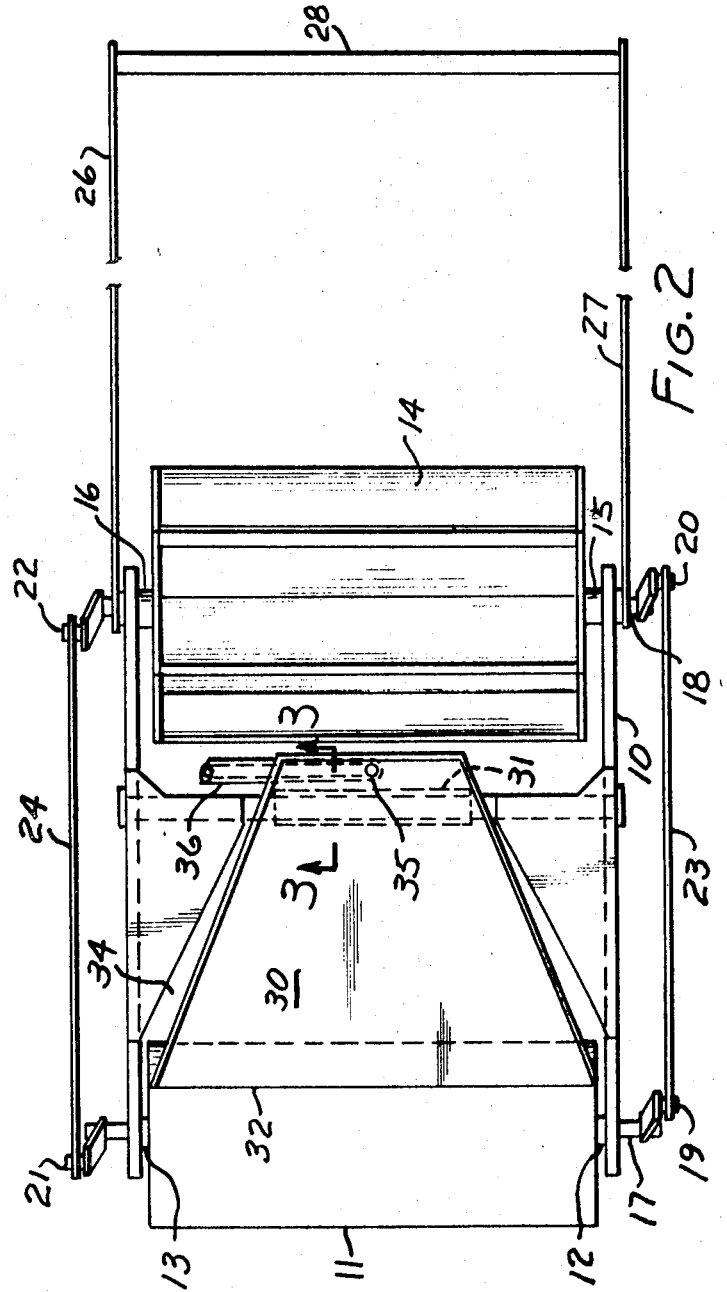
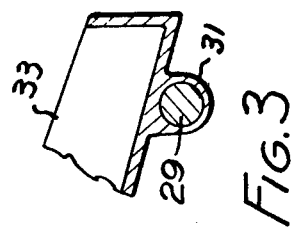
INVENTOR.
LESLIE E. TRIMBLE
BY *Angus & Mon*
ATTORNEYS.

OIL SKIMMER

This invention relates to a skimming device for removing oil from the top surface of a body of water. This invention would also be applicable to removing any contaminant from the surface of any fluid as long as the specific gravity of the contaminant is less than that of the fluid.

An object of this invention is to provide a quick means of lifting contaminating oil from the surface of water to a position where it may be removed physically to a storage reservoir for disposal.

A further object of the invention is to provide a device that may be towed or pushed by a boat at reasonable speeds to allow the clearance of contamination from large areas of fluid at a rapid rate of speed.

Another object of the invention is to provide apparatus for cleaning contaminants from the surface of a liquid by utilizing the motion of a boat to actuate the mechanical removal of the contaminant from the surface and the draining of said contaminant to a storage reservoir for disposal.

Other objects and advantages of this invention will be seen through a study of the drawings and description of a preferred embodiment of the invention which follows.

FIG. 1 is a side elevation of a preferred embodiment of the invention;

FIG. 2 is a plan view of the embodiment of FIG. 1, partially in cross section; and FIG. 3 is a cross section view taken along line 3—3 of FIG. 2.

In the preferred embodiment shown in FIG. 1 a frame 10 has a cylindrical float 11 attached to it by means of journal bearings 12 and 13 which permit rotation of the cylindrical float 11 with respect to the frame 10. A paddle wheel float 14 is attached to frame 10 by means of journal bearings 15 and 16. Cylindrical float 11 is mounted on shaft 17 while the paddle wheel float 14 is mounted on shaft 18. Both of these shafts protrude through the frame and the journal bearings 12, 13, 15 and 16 to provide room for the attachment of bellcranks 19, 20, 21 and 22. Connecting rods 23 and 24 link the crank portion of the bellcranks 19, 20, 21 and 22. The bellcranks 19, 20, 21 and 22 are so disposed angularly with respect to each other and the connecting rods 23 and 24 so that counterclockwise rotation of the paddle wheel will produce clockwise rotation of the cylindrical float 11. The paddles 25 on paddle wheel float 14 are curved so that pushing the float through the water against the curvature of the paddles 25 will produce an efficient rotating motion of the paddle wheel float 14. Two bail members 26 and 27 are conveniently swivelly connected on paddle wheel shaft 18. A push bar 28 joins and is pivotally connected to the bail members 26 and 27. A shaft 29 is mounted to frame 10 between the shafts 17 and 18 which mount the cylindrical float 11 and the paddle wheel float 14 and the shaft 29 is mounted to the frame parallel to shafts 17 and 18. A scraper 30 is pivotally mounted to shaft 29 by means of bearings 31. The scraper is of essentially flat fan shape narrowing at the bearing pivot area, then increasing in width to the total width of the cylindrical float 11. The widest portion of scraper 30 rests by force of its own weight on the top surface of cylindrical float 11 before the vertical centerline of the cylindrical float 11 so that a scraping line contact will be made with float 11 at point 32. Sides 33 and 34 of the scraper 30 form a trough to prevent the flow of oil or other contaminants off the side of the scraper 30. Scraper 30, resting its wide scraping edge on cylindrical float 11 while pivotally mounted to frame 10 forms an acute angle with frame 10 and the horizontal surface of the fluid, thereby creating a drain path for contaminants scraped off cylindrical float 11, and the sides 33 and 34 help guide the flow of contaminant down the trough to drain hole 35. The drain hole 35 may conveniently have a hose 36 attached to it to permit draining of the contaminant or oil from the drain hole through the hose 36 into a floating reservoir, or other storage means aboard the actuating vessel.

In use, push bar 28 would be engaged by a powered ship which would exert pushing force moving the skimmer forward causing the paddle wheel 14 to rotate in a counterclockwise direction which through the action of cranks 20 and 22 and connecting rods 23 and 24 would actuate bellcranks 19 and 21 connected to the cylindrical float 11. The cylindrical float 11 would rotate clockwise against scraper 30 so that contaminants or oil picked up from the surface on the rotating float would be scraped off by the scraper 30 and passed down through the trough formed on 30 between sides 33 and 34 to flow into drain 35 and then through hose 36 into some storage means for later disposal. Surface 37 of cylindrical float 11 may carry means such as small fingerlike protrusions to encourage picking up of contaminants but which will still permit efficient scraping by the scraper 30. Scraper 30 may have its scraping edge at contact point 32 adapted with a squeegee or similar means to help in the scraping action.

The embodiment described is preferred because the skimmer is pushed in front of the powered vessel thus keeping the vessel out of contact with the contaminant on the surface but, if desired, the direction of curvature on the paddles 25 may be reversed and the bellcrank angles adjusted so that both the cylindrical float 11 and the paddle wheel float 14 rotate in a clockwise direction for towing instead of pushing.

I claim:

1. A surface skimmer for removing floating contaminants from the surface of fluids and removing them for disposal which comprises:
   a. a frame, said frame being adapted to be moved over the surface of the fluids and having a first leading end and a second trailing end;
   b. a cylindrical float member, said cylindrical float member being adapted to absorb the contaminants and being rotatably mounted to said frame at said first end on the longitudinal axis of rotation;
   c. a paddle wheel member, said paddle wheel rotatably mounted to said frame at said second end, said paddle wheel member having an axis of rotation parallel to said axis of rotation of said cylindrical float member;
   d. a first crank means, said crank means mounted on said paddle wheel member;
   e. a second crank means, said second crank means mounted on said cylindrical float member;
   f. connecting rod means, said connecting rod means being constructed and arranged to transmit rotary motion from said first crank means on said paddle wheel to said second crank means on said cylindrical float;
   g. scraper means, the rotation of said cylindrical float member by said connecting rod means and said first and second crank means adapted to rotate said cylindrical float member against said scraper means; and
   h. drain means, said drain means adapted to remove materials scraped from said cylindrical float member by said scraper means.

2. Apparatus as described in claim 1 which includes said scraper means pivotally mounted to said frame between said cylindrical float means and said paddle wheel means, said scraper means substantially equal in width to said cylindrical float means, said scraper means adapted to make line contact with said cylindrical float means for removing contaminants from the surface of said cylindrical float means.

3. Apparatus as described in claim 2 which includes said scraper means located at an acute angle with said frame, said frame adapted to float horizontally and said scraper means adapted to drain contaminants scraped from said cylindrical float member for disposal.

4. Apparatus as described in claim 1 which includes the surface of said cylindrical float member provided with protuberance means, said protuberance means adapted to engage and pick up contaminants from the surface of fluids.

5. Apparatus as described in claim 2 which includes said scraper means provided with squeegee means, said squeegee means adapted to remove contaminants from the surface of said cylindrical float member.

6. Apparatus as described in claim 3 which includes said scraper means of substantially fan shape with said width of said scraper means in line contact with said cylindrical float member, said line contact of said scraper means substantially equal in length to said cylindrical float member, said fan shape of said scraper means of shorter dimension than said line contact with said cylindrical float member at said pivotal mounting to said frame, and said drain means adjacent said pivotal mounting to said frame.

7. Apparatus as described in claim 6 which includes said scraper means of substantially planar surface and a pair of side members, said side members adapted to guide contaminants scraped from said cylindrical float member down said planar surface of said scraper means to said drain means.

O-1897

PO-1050
(5/69)

UNITED STATES PATENT OFFICE
CERTIFICATE OF CORRECTION

Patent No. 3,608,728          Dated September 28, 1971

Inventor(s) LESLIE E. TRIMBLE

It is certified that error appears in the above-identified patent and that said Letters Patent are hereby corrected as shown below:

In the Patent

Claim 1(b), Column 2, line 32

"absorb" should be --adsorb--

Signed and sealed this 30th day of May 1972.

(SEAL)
Attest:

EDWARD M. FLETCHER, JR.          ROBERT GOTTSCHALK
Attesting Officer                 Commissioner of Patents